(12) United States Patent
Kim

(10) Patent No.: US 12,523,995 B2
(45) Date of Patent: Jan. 13, 2026

(54) APPARATUS AND METHOD FOR MANUFACTURING DISPLAY APPARATUS

(71) Applicant: Samsung Display Co., Ltd., Yongin-si (KR)

(72) Inventor: Yonggu Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 380 days.

(21) Appl. No.: 18/343,454

(22) Filed: Jun. 28, 2023

(65) Prior Publication Data

US 2024/0168468 A1    May 23, 2024

(30) Foreign Application Priority Data

Nov. 22, 2022   (KR) .................. 10-2022-0157514

(51) Int. Cl.
  *G05B 19/418*   (2006.01)
  *G09G 3/3233*   (2016.01)
(52) U.S. Cl.
  CPC ... *G05B 19/4188* (2013.01); *G05B 19/41885* (2013.01); *G05B 19/4189* (2013.01); *G09G 3/3233* (2013.01); *G05B 2219/31001* (2013.01); *G09G 2300/0842* (2013.01)

(58) Field of Classification Search
  None
  See application file for complete search history.

(56) References Cited

U.S. PATENT DOCUMENTS

| | | | |
|---|---|---|---|
| 11,151,799 B2 | 10/2021 | Ha et al. | |
| 2022/0258751 A1 | 8/2022 | Dane et al. | |
| 2022/0374566 A1* | 11/2022 | Ishikawa | H05K 13/086 |

FOREIGN PATENT DOCUMENTS

| | | |
|---|---|---|
| CN | 113917559 A | 1/2022 |
| CN | 115010072 A | 9/2022 |
| KR | 10-2074924 B1 | 2/2020 |
| KR | 10-2339932 B1 | 12/2021 |
| KR | 10-2366293 B1 | 2/2022 |
| KR | 10-2022-0027119 A | 3/2022 |
| KR | 10-2022-0095313 A | 7/2022 |

* cited by examiner

*Primary Examiner* — Sean Shechtman
(74) *Attorney, Agent, or Firm* — Womble Bond Dickinson (US) LLP

(57) ABSTRACT

A controller includes a simulator configured to simulate a final model for converting at least one of 1-$1^{st}$ processors and 1-$2^{nd}$ processors into a down state, in a virtual space that is a virtual space, so that a filling rate, which is a ratio of a used capacity of the storage to a total capacity of the storage, is equal to or less than a first value, and a process controller configured to control a first process line according to the final model.

20 Claims, 6 Drawing Sheets

APPARATUS AND METHOD FOR MANUFACTURING DISPLAY APPARATUS

CROSS-REFERENCE TO RELATED APPLICATION

This application claims priority to, and the benefit of, Korean Patent Application No. 10-2022-0157514, filed on Nov. 22, 2022, in the Korean Intellectual Property Office, the disclosure of which is incorporated by reference herein in its entirety.

BACKGROUND

1. Field

One or more embodiments relate to an apparatus for manufacturing a display apparatus, and to a method of manufacturing a display apparatus.

2. Description of the Related Art

Mobility-based electronic devices are widely used. Recently, tablet personal computers (PCs), in addition to small electronic devices, such as mobile phones, have been widely used as mobile electronic devices.

A mobile electronic device includes a display apparatus for providing visual information, such as an image to a user, to support various functions. Recently, as other components for driving a display apparatus have been miniaturized, the proportion of the display apparatus in an electronic device has gradually increased, and a structure that is bendable from a flat state to have a certain angle has been developed.

SUMMARY

According to one or more embodiments, a process line is controlled so that a filling rate of a storage does not exceed a designated value.

However, these aspects are examples, and the present disclosure is not limited thereto.

Additional aspects will be set forth in part in the description that follows and, in part, will be apparent from the description, or may be learned by practice of the presented embodiments.

According to one or more embodiments, an apparatus for manufacturing a display apparatus includes According to one or more embodiments, a method of manufacturing a display apparatus includes Other aspects of the present disclosure will become more apparent from the drawings, the claims, and the detailed description.

BRIEF DESCRIPTION OF THE DRAWINGS

The above and other aspects of some embodiments will be more apparent from the following description taken in conjunction with the accompanying drawings, in which.

DETAILED DESCRIPTION

Figure 1:
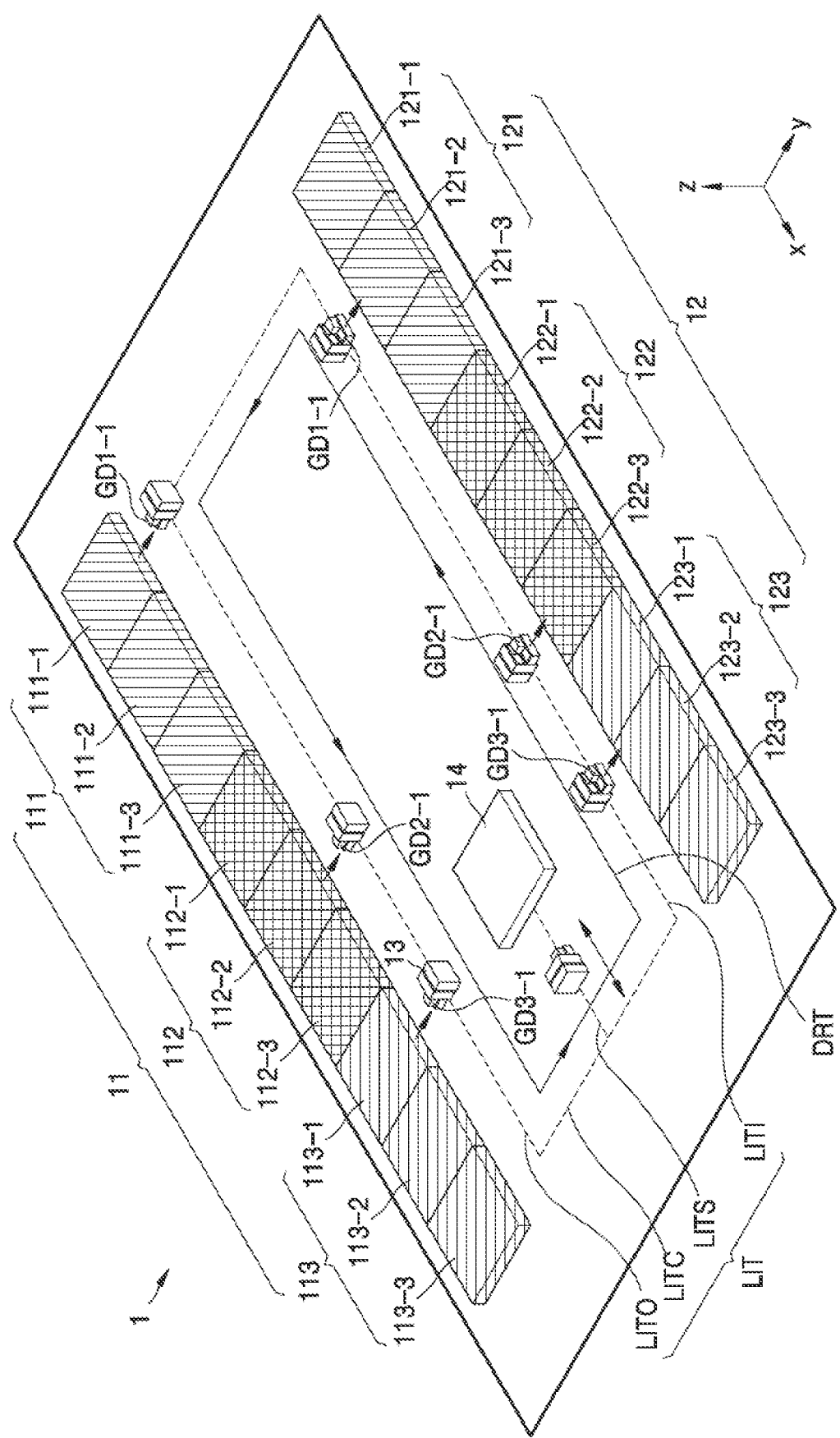
FIG. 1 is a schematic perspective view illustrating an apparatus for manufacturing a display apparatus, according to one or more embodiments.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in different forms, and should not be construed as being limited to only the illustrated embodiments herein. Further, each of the features of the various embodiments of the present disclosure may be combined or combined with each other, in part or in whole, and technically various interlocking and driving are possible. Each embodiment may be implemented independently of each other or may be implemented together in an association. The described embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression such as "at least one of A and B" and "at least one of A or B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Further, the various components of these devices may be a process or thread, running on one or more processors, in one or more computing devices, executing computer program instructions and interacting with other system components for performing the various functionalities described herein. The computer program instructions are stored in a memory that may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
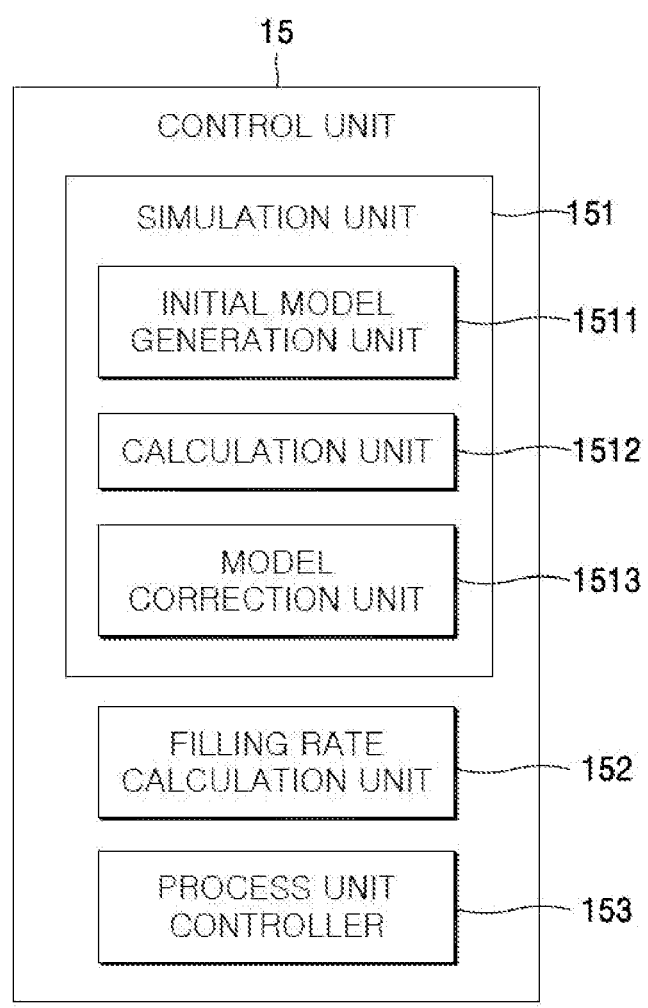
FIG. 2 is a diagram schematically illustrating elements of a controller, according to one or more embodiments.

FIG. 1 is a schematic perspective view illustrating an apparatus for manufacturing a display apparatus, according to one or more embodiments. FIG. 2 is a diagram schematically illustrating elements of a controller (e.g., a control unit), according to one or more embodiments.

Referring to FIGS. 1 and 2, an apparatus 1 for manufacturing a display apparatus may include a first process line 11, a second process line 12, a plurality of transporters (e.g., transport units) 13, a storage (e.g., a storage unit) 14, and a controller 15.

The first process line 11 may include a 1-$1^{st}$ processor/process unit 111, a 1-$2^{nd}$ processor 112, and a 1-$3^{rd}$ processor 113. The 1-$1^{st}$ processor 111, the 1-$2^{nd}$ processor 112, and the 1-3$^{rd}$ processor 113 may be sequentially arranged in a first direction (e.g., an x-axis direction). However, this is merely an example, and the first process line 11 may include, for example, only the 1-1$^{st}$ processor 111 and the 1-2$^{nd}$ processor 112, or the first process line 11 may further include a 1-4th processor.

The 1-1$^{st}$ processor 111 primarily processes a first component into a 1-1$^{st}$ component GD1-1. A plurality of 1-1$^{st}$ processors 111 may be provided. The first component may be carried into each of the plurality of 1-1$^{st}$ processors 111. The first component carried into each of the plurality of 1-1$^{st}$ processors 111 may be primarily processed into the 1-1$^{st}$ component GD1-1. When the primary processing of the first component into the 1-1$^{st}$ component GD1-1 is completed, the 1-1$^{st}$ component GD1-1 carried into each of the plurality of 1-1$^{st}$ processors 111 may be carried out from each of the plurality of 1-1$^{st}$ processors 111.

For example, the plurality of 1-1$^{st}$ processors 111 may include a 1-11$^{st}$ processor 111-1, a 1-12$^{th}$ processor 111-2, and a 1-13th processor 111-3. The 1-11$^{th}$ processor 111-1, the 1-12th processor 111-2, and the 1-13th processor 111-3 may be sequentially arranged in the first direction (e.g., the x-axis direction). However, this is merely an example, and the 1-1$^{st}$ processor 111 may include, for example, only the 1-11$^{th}$ processor 111-1 and the 1-12th processor 111-2, or the 1-1$^{st}$ processor 111 may further include a 1-14$^{th}$ processor.

The 1-2$^{nd}$ processor 112 primarily processes a second component into a 2-1$^{st}$ component GD2-1, and a plurality of 1-2$^{nd}$ processors 112 may be provided. The second component may be carried into each of the plurality of 1-2$^{nd}$ processors 112. The second component carried into each of the plurality of 1-2$^{nd}$ processors 112 may be primarily processed into the 2-1$^{st}$ component GD2-1. When the primary processing of the second component into the 2-1$^{st}$ component GD2-1 is completed, the 2-1$^{st}$ component GD2-1 carried into each of the plurality of 1-2$^{nd}$ processors 112 may be carried out from each of the plurality of 1-2$^{nd}$ processors 112.

For example, the plurality of 1-2$^{nd}$ processors 112 may include a 1-21$^{st}$ processor 112-1, a 1-22$^{nd}$ processor 112-2, and a 1-23$^{rd}$ processor 112-3. The 1-21$^{st}$ processor 112-1, the 1-22$^{nd}$ processor 112-2, and the 1-23$^{rd}$ processor 112-3 may be sequentially arranged in the first direction (e.g., the x-axis direction). However, this is merely an example, and the 1-2$^{nd}$ processor 112 may include, for example, only the 1-21$^{st}$ processor 112-1 and the 1-22$^{nd}$ processor 112-2, or s The 1-3$^{rd}$ processor 113 primarily processes a third component into a 3-1$^{st}$ component GD3-1. A plurality of 1-3$^{rd}$ processors 113 may be provided. The third component may be carried into each of the plurality of 1-3$^{rd}$ processors 113. The third component carried into each of the plurality of 1-3$^{rd}$ processors 113 may be primarily processed into the 3-1$^{st}$ component GD3-1. When the primary processing of the third component into the 3-1$^{st}$ component GD3-1 is completed, the 3-1$^{st}$ component GD3-1 carried into each of the plurality of 1-3$^{rd}$ processors 113 may be carried out from each of the 1-3$^{rd}$ processors 113.

For example, the plurality of 1-3$^{rd}$ processors 113 may include a 1-31$^{st}$ processor 113-1, a 1-32$^{nd}$ processor 113-2, and a 1-33$^{rd}$ processor 113-3. The 1-31$^{st}$ processor 113-1, the 1-32$^{nd}$ processor 113-2, and the 1-33$^{rd}$ processor 113-3 may be sequentially arranged in the first direction (e.g., the x-axis direction). However, this is merely an example, and the 1-3$^{rd}$ processor 113 may include, for example, only the 1-31$^{st}$ processor 113-1 and the 1-32$^{nd}$ processor 113-2, or the 1-3$^{rd}$ processor 113 may further include the 1-34th processor.

Each of the plurality of 1-1$^{st}$ processors 111, the plurality of 1-2$^{nd}$ processors 112, and the plurality of 1-3$^{rd}$ processors 113 may be in any one of a run state, an idle state, and a down state. The run state may be a state in which the first component, the second component, and the third component may be respectively processed into the 1-1$^{st}$ component GD1-1, the 2-1$^{st}$ component GD2-1, and the 3-1$^{st}$ component GD3-1. The idle state may be a state in which a processor may not temporarily operate, due to, for example, a temporary error. The down state may be a state in which a processor may not continuously operate.

A second process line 12 may be spaced apart from the first process line 11 in a second direction (e.g., a y-axis direction) intersecting the first direction (e.g., the x-axis direction). The second process line 12 may include a 2-1$^{st}$ processor 121, a 2-2$^{nd}$ processor 122, and a 2-3$^{rd}$ processor 123. The 2-1$^{st}$ processor 121, the 2-2$^{nd}$ processor 122, and the 2-3$^{rd}$ processor 123 may be sequentially arranged in the first direction (e.g., the x-axis direction). However, this is merely an example, and the second process line 12 may include, for example, only the 2-1$^{st}$ processor 121 and the 2-2$^{nd}$ processor 122, or the second process line 12 may further include a 2-4th processor.

The 2-1$^{st}$ processor 121 secondarily processes the 1-1$^{st}$ component GD1-1. A plurality of 2-1$^{st}$ processors 121 may be provided. The 1-1$^{st}$ component GD1-1 may be carried into each of the plurality of 2-1$^{st}$ processors 121. The 1-1$^{st}$ component GD1-1 carried into each of the plurality of 2-1$^{st}$ processors 121 may be secondarily processed.

For example, the plurality of 2-1$^{st}$ processors 121 may include a 2-11$^{th}$ processor 121-1, a 2-12$^{th}$ processor 121-2, and a 2-13$^{th}$ processor 121-3. The 2-11$^{th}$ processor 121-1, the 2-12$^{th}$ processor 121-2, and the 2-13$^{th}$ processor 121-3 may be sequentially arranged in the first direction (e.g., the x-axis direction). However, this is merely an example, and the 2-1$^{st}$ processor 121 may include, for example, only the 2-11$^{th}$ processor 121-1 and the 2-12$^{th}$ processor 121-2, or the 2-1$^{st}$ processor 121 may further include a 2-14$^{th}$ processor.

The 2-2$^{nd}$ processor 122 secondarily processes the 2-1$^{st}$ component GD2-1. A plurality of 2-2$^{nd}$ processors 122 may be provided. The 2-1$^{st}$ component GD2-1 may be carried into each of the plurality of 2-2$^{nd}$ processors 122. The 2-1$^{st}$ component GD2-1 carried into each of the plurality of 2-2$^{nd}$ processors 122 may be secondarily processed.

For example, the plurality of 2-2$^{nd}$ processors 122 may include a 2-21$^{st}$ processor 122-1, a 2-22$^{nd}$ processor 122-2, and a 2-23$^{rd}$ processor 122-3. The 2-21$^{st}$ processor 122-1, the 2-22$^{nd}$ processor 122-2, and the 2-23$^{rd}$ processor 122-3 may be sequentially arranged in the first direction (e.g., the x-axis direction). However, this is merely an example, and the 2-2$^{nd}$ processor 122 may include, for example, only the 2-21$^{st}$ processor 122-1 and the 2-22$^{nd}$ processor 122-2, or the 2-2$^{nd}$ processor 122 may further include a 2-24$^{th}$ processor.

The 2-3$^{rd}$ processor 123 secondarily processes the 3-1$^{st}$ component GD3-1. A plurality of 2-3$^{rd}$ processors 123 may be provided. The 3-1$^{st}$ component GD3-1 may be carried into each of the plurality of 2-3$^{rd}$ processors 123. The 3-1$^{st}$ component GD3-1 carried into each of the plurality of 2-3$^{rd}$ processors 123 may be secondarily processed. For example, the plurality of 2-3$^{rd}$ processors 123 may include a 2-31$^{st}$ processor 123-1, a 2-32$^{nd}$ processor 123-2, and a 2-33$^{rd}$ processor 123-3. The 2-31$^{st}$ processor 123-1, the 2-32$^{nd}$ processor 123-2, and the 2-33$^{rd}$ processor 123-3 may be sequentially arranged in the first direction (e.g., the x-axis direction). However, this is merely an example, and the 2-3$^{rd}$ processor 123 may include, for example, only the 2-31$^{st}$ processor 123-1 and the 2-32$^{nd}$ processor 123-2, or the 2-3$^{rd}$ processor 123 may further include a 2-34$^{th}$ processor.

The storage 14 may be located between the first process line 11 and the second process line 12, and may store the 1-1$^{st}$ component GD1-1, the 2-1$^{st}$ component GD2-1, and the 3-1$^{st}$ component GD3-1. That is, the 1-1$^{st}$ component GD1-1 processed in the 1-1$^{st}$ processor 111, the 1-2$^{nd}$ component processed in the 1-2$^{nd}$ processor 112, and the 1-3$^{rd}$ component processed in the 1-3$^{rd}$ processor 113 may be carried into the storage 14, or may be carried out from the storage 14.

Due to considerations of size and cost of the storage 14, a total storage capacity of the storage 14 may be limited. For example, a sum of the 1-1$^{st}$ component GD1-1, the 2-1$^{st}$ component GD2-1, and the 3-1$^{st}$ component GD3-1, which may be stored in the storage 14, may not exceed a designated value. Hereinafter, a ratio of an amount stored in, or a used capacity of, the storage 14 (e.g., area or volume) to a total capacity of the storage 14 is referred to as a filling rate. For example, when a sum of some of the 1-1$^{st}$ component GD1-1, the 2-1$^{st}$ component GD2-1, and the 3-1$^{st}$ component GD3-1, which may be stored in the storage 14, is 100, and when a sum of others of the 1-1$^{st}$ component GD1-1, the 2-1$^{st}$ component GD2-1, and the 3-1$^{st}$ component GD3-1, which are currently stored in the storage 14, is 30, a filling rate may be 30%.

A transporter 13 may move along a transport path LIT located between the first process line 11 and the second process line 12. A plurality of transporters 13 may be provided. The plurality of transporters 13 may transport the 1-1$^{st}$ component GD1-1, the 2-1$^{st}$ component GD2-1, and the 3-1$^{st}$ component GD3-1 from the first process line 11 to the second process line 12 or to the storage 14. The plurality of transporters 13 may take out the 1-1$^{st}$ component GD1-1, the 1-2$^{nd}$ component, and the 1-3$^{rd}$ component from the first process line 11, may transport them to the second process line 12, and then may bring them into the second process line 12.

In detail, the plurality of transporters 13 may take out the 1-1$^{st}$ component GD1-1 from any one of the plurality of 1-1$^{st}$ processors 111, may transport the 1-1$^{st}$ component GD1-1 to any one of the plurality of 2-1$^{st}$ processors 121, and then may bring the 1-1$^{st}$ component GD1-1 into any one of the 2-1$^{st}$ processors 121. Also, the plurality of transporters 13 may take out the 2-1$^{st}$ component GD2-1 from any one of the plurality of 1-2$^{nd}$ processors 112, may transport the 2-1$^{st}$ component GD2-1 to any one of the 2-2$^{nd}$ processors 122, and then may bring the 2-1$^{st}$ component GD2-1 into any one of the 2-2$^{nd}$ processors 122. The plurality of transporters 13 may take out the 3-1$^{st}$ component GD3-1 from any one of the plurality of 1-3$^{rd}$ processors 113, may transport the 3-1$^{st}$ component GD3-1 to any one of the 2-3$^{rd}$ processors 123, and then may bring the 3-1$^{st}$ component GD3-1 into any one of the 2-3$^{rd}$ processors 123.

The plurality of transporters 13 may circulate in a transport direction DRT, while moving along the transport path LIT. A plurality of transport paths LIT may include a take-out path LITO, a take-in path LITI, a connection path LITC, and a storage path LITS.

The take-out path LITO may be a path through which the plurality of transporters 13 take out the 1-1$^{st}$ component GD1-1, the 2-1$^{st}$ component GD2-1, and the 3-1$^{st}$ component GD3-1 from the first process line 11. For example, the take-out path LITO may extend in the first direction (e.g., the x-axis direction) parallel to the first process line 11, and may be located adjacent to the first process line 11. The plurality of transporters 13 may move in the transport direction DRT along the take-out path LITO, may stop adjacent to any one of the plurality of 1-1$^{st}$ processors 111, the plurality of 1-2$^{nd}$ processors 112, or the plurality of 1-3$^{rd}$ processors 113, and then may take out any one of the 1-1$^{st}$ component GD1-1, the 2-1$^{st}$ component GD2-1, or the 3-1$^{st}$ component GD3-1.

The take-in path LITI may be a path through which the plurality of transporters 13 bring the 1-1$^{st}$ component GD1-1, the 2-1$^{st}$ component GD2-1, or the 3-1$^{st}$ component GD3-1 into the second process line 12. For example, the take-in path LITI may extend in the first direction (e.g., the x-axis direction) parallel to the second process line 12, and may be located adjacent to the second process line 12. The plurality of transporters 13 may move in the transport direction DRT along the take-in path LITI, may stop adjacent to any one of the plurality of 2-1$^{st}$ processors 121, the plurality of 2-2$^{nd}$ processors 122, or the plurality of 2-3$^{rd}$ processors 123, and then may bring in any one of the 1-1$^{st}$ component GD1-1, the 2-1$^{st}$ component GD2-1, or the 3-1$^{st}$ component GD3-1.

The connection path LITC may connect the take-out path LITO to the take-in path LITI. Two connection paths LITC may be provided. The connection path LITC may extend in the second direction (e.g., the y-axis direction), and respective ends of the connection path LITC may be connected to an end of the take-out path LITO and an end of the take-in path LITI. The plurality of transporters 13 may circulate along the take-out path LITO, the connection path LITC, the take-in path LITI, and the connection path LITC in the transport direction DRT.

In this structure, a planar shape of the transport path LIT may be a quadrangular shape. Also, the transport direction DRT may be a counterclockwise direction (e.g., a direction rotating around a +Z-axis) when viewed from above. However, this is merely an example, and the transport path LIT and the transport direction DRT are not limited thereto.

The storage path LITS may be a path through which the plurality of transporters 13 bring the 1-1$^{st}$ component GD1-1, the 1-2$^{nd}$ component, and the 1-3$^{rd}$ component into the storage 14. The storage path LITS may be connected to the connection path LITC. The plurality of transporters 13 may take out any one of the 1-1$^{st}$ component GD1-1, the 2-1$^{st}$ component GD2-1, and the 3-1$^{st}$ component GD3-1 from the first process line 11, may sequentially move along the take-out path LITO, the connection path LITC, and the storage path LITS, may stop adjacent to the storage 14, may bring any one of the 1-1$^{st}$ component GD1-1, the 2-1$^{st}$ component GD2-1, or the 3-1$^{st}$ component GD3-1 into the storage 14, and then may sequentially move along the storage path LITS, the connection path LITC, and the take-in path LITI.

The controller 15 may control the first process line 11. The controller 15 may include a simulator (e.g., a simulation unit) 151, a filling rate calculator (e.g., a filling rate calculator) 152, and a process controller (e.g., a processor controller) 153.

The simulator 151 may simulate a final model for converting at least one of the plurality of 1-1$^{st}$ processors 111, the plurality of 1-2$^{nd}$ processors 112, and the plurality of 1-3$^{rd}$ processors 113 into a down state (e.g., simulated in a digital twin that is a virtual space) so that a filling rate is equal to or less than a first value.

When a processing speed of the first process line 11 is higher than a processing speed of the second process line 12, the amount of the 1-1$^{st}$ component GD1-1, the 2-1$^{st}$ component GD2-1, and the 3-1$^{st}$ component GD3-1 stored in the storage 14 may increase, and thus, a filling rate may increase. When the filling rate is greater than the first value, the efficiency of the apparatus 1 for manufacturing a display apparatus may decrease. Accordingly, the first value may be a numerical value for efficiently operating the apparatus 1 for manufacturing a display apparatus. That is, the first value may be an appropriate filling rate. For example, the first value may be about 80%. However, this is merely an example, and the first value is not limited thereto.

Accordingly, the final model may be a model for determining which of the plurality of $1\text{-}1^{st}$ processors 111, the plurality of $1\text{-}2^{nd}$ processors 112, and the plurality of $1\text{-}3^{rd}$ processors 113 is to be converted into a down state (e.g., in the digital twin that is a virtual space) so that the filling rate is equal to or less than the first value corresponding to an appropriate filling rate. For example, the final model may be a model for converting the $1\text{-}11^{th}$ processor 111-1, the $1\text{-}21^{st}$ processor 112-1, and the $1\text{-}31^{st}$ processor 113-1 into a down state, so that the filling rate is equal to or less than about 80%.

The simulator 151 may include an initial model generator (e.g., an initial model generation unit) 1511, a calculator (e.g., a calculation unit) 1512, and a model corrector (e.g., a model correction unit) 1513.

The initial model generator 1511 may generate an initial model for converting at least one of the plurality of $1\text{-}1^{st}$ processors 111, the plurality of $1\text{-}2^{nd}$ processors 112, and the plurality of $1\text{-}3^{rd}$ processors 113 into a down state, in the digital twin/virtual space, so that the filling rate is equal to or less than the first value. That is, the initial model may be a first model simulated by the simulator 151. For example, the initial model may be a model for converting the $1\text{-}11^{th}$ processor 111-1 into a down state.

The calculator 1512 may calculate the filling rate in the digital twin/virtual space after controlling the first process line 11 for a first time, and according to the initial model, in the digital twin/virtual space. For example, the first time may be about one hour. However, this is merely an example, and the first time is not limited thereto.

When the filling rate in the digital twin/virtual space according to the initial model is equal to or less than the first value, the initial model may represent a final model.

However, when the filling rate in the digital twin/virtual space according to the initial model is greater than the first value, the model corrector 1513 may correct the initial model to thereby generate a second model.

Compared to the initial model, the second model may be a model for additionally converting one or more of the plurality of $1\text{-}1^{st}$ processors 111, the plurality of $1\text{-}2^{nd}$ processors 112, and the plurality of $1\text{-}3^{rd}$ processors 113 with a highest progress rate, which are in a run state, into a down state. The term "progress rate" may refer to a ratio of a current processing number to a target processing number for a designated time. For example, when a one-day target processing number of the $1\text{-}12^{th}$ processor 111-2 for the first component is 100 and the number of first components processed by the $1\text{-}12^{th}$ processor 111-2 so far is 90, a progress rate of the $1\text{-}12^{th}$ processor 111-2 may be 90%.

For example, when the filling rate in the digital twin/virtual space according to the initial model for converting the $1\text{-}11^{th}$ processor 111-1 into a down state is greater than the first value, the model corrector 1513 may correct the initial model into the second model for additionally converting the $1\text{-}12^{th}$ processor 111-2 into a down state.

The calculator 1512 may calculate the filling rate in the digital twin/virtual space after controlling the first process line 11 for the first time, according to the second model, in the digital twin/virtual space.

When the filling rate in the digital twin/virtual space according to the second model is equal to or less than the first value, the second model may represent a final model.

However, when the filling rate in the digital twin/virtual space according to the second model is greater than the first value, the model corrector 1513 may correct the second model into a third model.

Compared to the second model, the third model may be for additionally converting any one with a highest progress rate, from among the plurality of $1\text{-}1^{st}$ processors 111, the plurality of $1\text{-}2^{nd}$ processors 112, and the plurality of $1\text{-}3^{rd}$ processors 113 that are in a run state, into a down state.

The calculator 1512 may calculate the filling rate in the digital twin/virtual space after controlling the first process line 11 for the first time, according to the third model, in the digital twin/virtual space.

When the filling rate in the digital twin/virtual space according to the third model is equal to or less than the first value, the third model may be a final model.

However, when the filling rate in the digital twin/virtual space according to the third model is greater than the first value, the above process may be repeatedly performed.

As a result, the filling rate in the digital twin/virtual space according to the final model may be equal to or less than the first value.

The process controller 153 may control the first process line 11 according to the final model. That is, the process controller 153 may control the first process line 11 according to the final model in reality, or in operation, as opposed to in the digital twin that is a virtual space.

The filling rate calculator 152 may calculate the filling rate in real time after the process controller 153 controls the first process line 11 according to the final model.

When the filling rate calculated by the filling rate calculator 152 satisfies a first condition, the process controller 153 may convert the entire first process line 11 into a down state.

The first condition may be a condition in which the filling rate is greater than a second value. The second value may be a value close to about 100% of a limit filling rate of the storage 14. That is, the second value may be higher than the first value. For example, the second value may be about 90%. Accordingly, when the filling rate calculated by the filling rate calculator 152 is greater than the second value, the process controller 153 may convert the entire first process line 11 into a down state, to thereby prevent a situation in which the storage 14 may no longer store the $1\text{-}1^{st}$ component GD1-1, the $2\text{-}1^{st}$ component GD2-1, and the $3\text{-}1^{st}$ component GD3-1 due to the filling rate reaching 100%.

The first condition may be a condition in which the filling rate is greater than the first value after the first time elapses from a time when the process controller 153 controls the first process line 11 according to the final model. Accordingly, when the filling rate is still greater than the first value even after the first time elapses, the process controller 153 may convert the entire first process line 11 into a down state, to thereby efficiently operate the apparatus 1 for manufacturing a display apparatus.

When the filling rate calculated by the filling rate calculator 152 satisfies a second condition, the process controller 153 may continue to control the first process line 11 according to the final model.

The second condition may be a condition excluding the first condition. For example, the second condition may be a condition in which the filling rate is equal to or less than the second value. Also, the second condition may be a condition in which the filling rate is equal to or less than the first value, after the first time elapses from a time when the process controller 153 controls the first process line 11 according to the final model.

Figure 3:
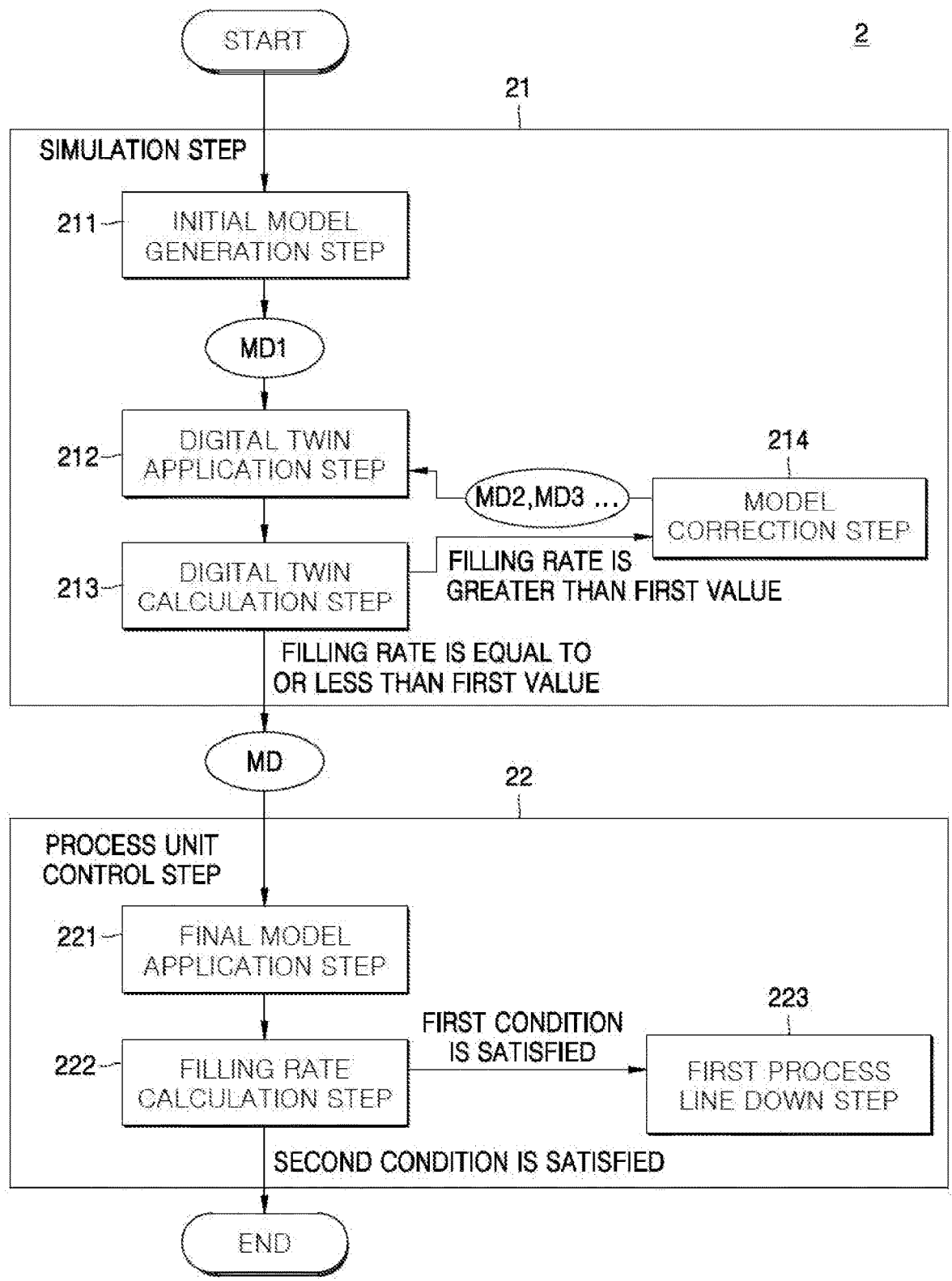
FIG. 3 is a diagram for describing a control operation in a method of manufacturing a display apparatus, according to one or more embodiments.

FIG. 3 is a diagram for describing a control step in a method of manufacturing a display apparatus, according to one or more embodiments.

Referring to FIG. 3, a control operation 2 may be an operation in which the controller 15 (see FIG. 2) controls the first process line 11 (see FIG. 1). The control operation 2 may include a simulation operation 21 and a processor control operation 22.

The simulation operation 21 may be an operation in which the simulator 151 (see FIG. 2) simulates a final model MD for converting at least one of the plurality of 1-$1^{st}$ processors 111, the plurality of 1-$2^{nd}$ processors 112, and the plurality of 1-$3^{rd}$ processors 113 into a down state, in a digital twin/virtual space, so that a filling rate is equal to or less than a first value. The simulation operation 21 may include an initial model generation operation 211, a digital twin application operation 212, and a digital twin calculation operation 213.

The initial model generation operation 211 may be an operation in which the initial model generator 1511 (see FIG. 2) generates an initial model MD1 for converting at least one of the plurality of 1-$1^{st}$ processors 111, the plurality of 1-$2^{nd}$ processors 112, and the plurality of 1-$3^{rd}$ processors 113 into a down state, in the digital twin/virtual space, so that the filling rate is equal to or less than the first value.

The digital twin application operation 212 may include an operation in which the calculator 1512 (see FIG. 2) controls the first process line 11 (see FIG. 1) according to the initial model MD1 in the digital twin/virtual space.

The digital twin calculation operation 213 may include an operation in which the calculator 1512 (see FIG. 2) calculates the filling rate in the digital twin/virtual space after a first time elapses from a time when the digital twin application operation 212 starts according to the initial model MD1.

When the filling rate in the digital twin/virtual space according to the initial model MD1 is equal to or less than the first value, the initial model MD1 may be the final model MD.

However, when the filling rate in the digital twin/virtual space according to the initial model MD1 calculated in the digital twin calculation operation 213 is greater than the first value, a model correction operation 214 may include an operation in which the model corrector 1513 (see FIG. 2) corrects the initial model MD1 into a second model MD2.

The digital twin application operation 212 may further include an operation in which the calculator 1512 (see FIG. 2) controls the first process line 11 (see FIG. 1) according to the second model MD2 in the digital twin/virtual space.

The digital twin calculation operation 213 may further include an operation in which the calculator 1512 (see FIG. 2) calculates the filling rate in the digital twin/virtual space after the first time elapses from a time when the digital twin application operation 212 starts according to the second model MD2.

When the filling rate in the digital twin/virtual space according to the second model MD2 is equal to or less than the first value, the second model MD2 may be the final model MD.

However, when the filling rate in the digital twin/virtual space according to the second model MD2 calculated in the digital twin calculation operation 213 is greater than the first value, the model correction operation 214 may further include an operation in which the model corrector 1513 (see FIG. 2) corrects the second model MD2 into a third model MD3.

The digital twin application operation 212 may further include an operation in which the calculator 1512 (see FIG. 2) controls the first process line 11 (see FIG. 1) according to the third model MD3 in the digital twin/virtual space.

The digital twin calculation operation 213 may further include an operation in which the calculator 1512 (see FIG. 2) calculates the filling rate in the digital twin/virtual space after the first time elapses from a time when the digital twin application operation 212 starts according to the third model MD3.

When the filling rate in the digital twin/virtual space according to the third model M3 is equal to or less than the first value, the third model MD3 may be the final model MD.

However, when the filling rate in the digital twin/virtual space according to the third model MD3 is greater than the first value, the above process may be repeatedly performed.

As a result, the filling rate in the digital twin/virtual space according to the final model MD may be equal to or less than the first value.

The processor control operation 22 may include a final model application operation 221, a filling rate calculation operation 222, and a first process line down operation 223.

The final model application operation 221 may be an operation in which the process controller 153 (see FIG. 2) controls the first process line 11 (see FIG. 1) according to the final model MD.

The filling rate calculation operation 222 may be an operation in which the filling rate calculator 152 (see FIG. 2) calculates the filling rate after the final model application operation 221.

The first process line down operation 223 may be an operation in which the process controller 153 (see FIG. 2) converts the entire first process line 11 (see FIG. 1) into a down state, when the filling rate calculated in the filling rate calculation operation 222 satisfies a first condition. The first condition may be a condition in which the filling rate is greater than a second value. The first condition may be a condition in which the filling rate is greater than the first value after the first time elapses from a time when the process controller 153 (see FIG. 2) controls the first process line 11 (see FIG. 1) according to the final model MD.

When the filling rate calculated by the filling rate calculator 152 (see FIG. 2) after the first process line down operation 223 is lowered to be equal to or less than the first value, the simulation operation 21 may start again.

The process controller 153 (see FIG. 2) may continue to control the first process line 11 according to the final model when the filling rate calculated by the filling rate calculator 152 (see FIG. 2) satisfies a second condition.

The second condition may be a condition excluding the first condition. For example, the second condition may be a condition in which the filling rate is equal to or less than the second value. Also, the second condition may be a condition in which the filling rate is equal to or less than the first value after the first time elapses from a time when the process controller 153 (see FIG. 2) controls the first process line 11 (see FIG. 2) according to the final model MD.

Figure 4:
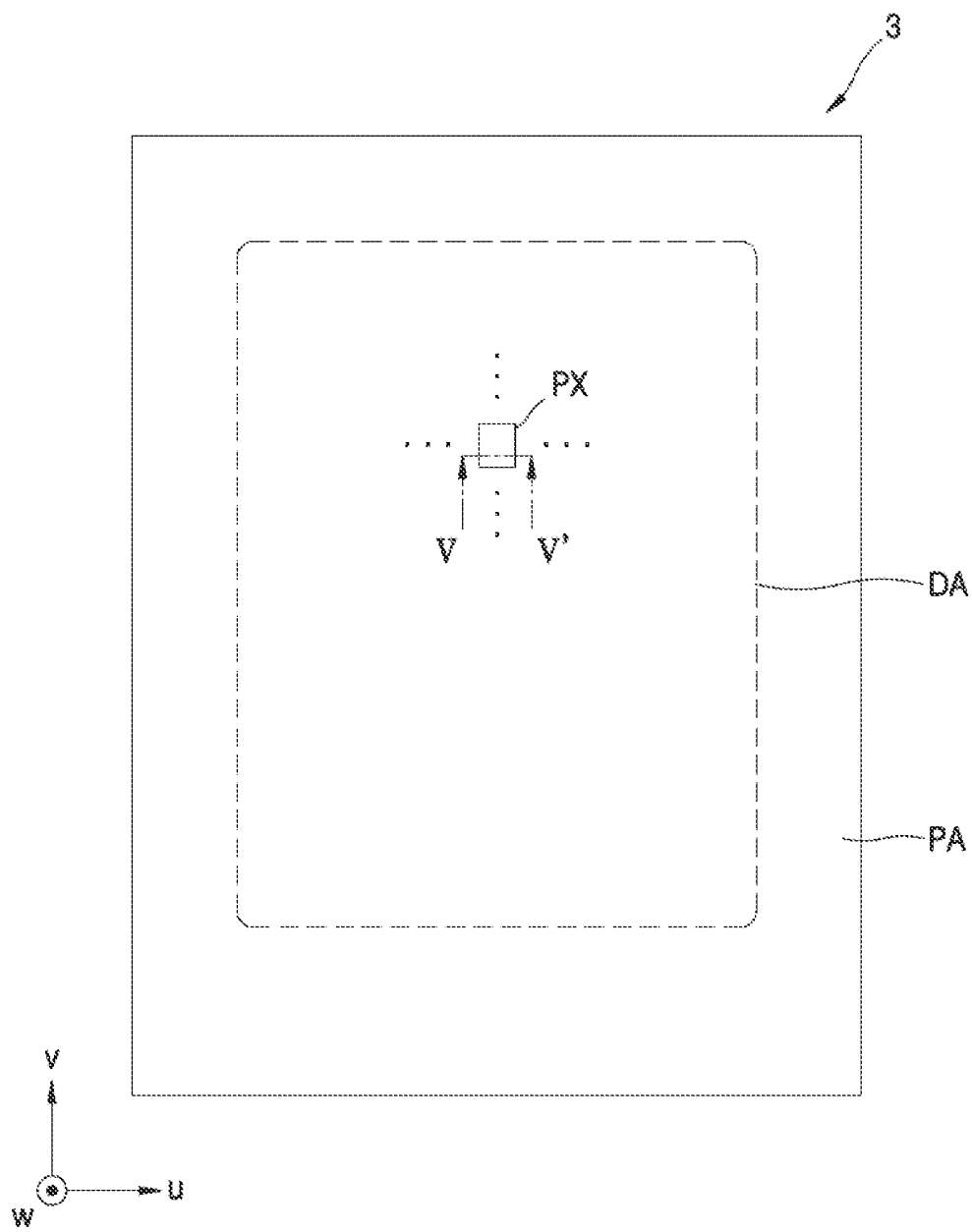
FIG. 4 is a plan view schematically illustrating a display apparatus, according to one or more embodiments.

FIG. 4 is a plan view schematically illustrating a display apparatus, according to one or more embodiments.

Referring to FIG. 4, a display apparatus 3 may include a display area DA and a peripheral are PA located outside the display area DA. The display apparatus 3 may provide an image through an array of pixels PX that are two-dimensionally arranged in the display area DA.

The peripheral area PA where an image is not provided may entirely or partially surround the display area DA (e.g., in plan view). A driver or the like for providing an electrical signal or power to a pixel circuit corresponding to each of the pixels PX may be located in the peripheral area PA. A pad to which an electronic device, a printed circuit board, or the like may be electrically connected may be located in the peripheral area PA.

Although the display apparatus 3 includes an organic light-emitting diode (OLED) as a light-emitting element, the display apparatus 3 of the disclosure is not limited thereto. In one or more other embodiments, the display apparatus 3 may be a light-emitting display apparatus including an inorganic light-emitting diode, that is, may be an inorganic light-emitting display apparatus. The inorganic light-emitting diode may include a PN diode including inorganic semiconductor-based materials. When a voltage is applied to a PN junction diode in a forward direction, holes and electrons may be injected, and energy generated by recombination of the holes and electrons may be converted into light energy to emit light of a corresponding color. The inorganic light-emitting diode may have a width of several to hundreds of micrometers, and in some embodiments, the inorganic light-emitting diode may be referred to as a micro-LED. In one or more other embodiments, the display apparatus 3 may be a quantum dot light-emitting display apparatus.

The display apparatus 3 may be used as a display screen of not only a portable electronic device, such as a mobile phone, a smartphone, a tablet personal computer (PC), a mobile communication terminal, an electronic organizer, an electronic book, a portable multimedia player (PMP), a navigation device, or an ultra-mobile PC (UMPC) but also any of various products, such as a television, a laptop computer, a monitor, an advertisement board, or an Internet of things (IoT) device. Also, the display apparatus 3 according to one or more embodiments may be used in a wearable device, such as a smart watch, a watch phone, a glasses-type display, or a head-mounted display (HMD). Also, the display apparatus 3 according to one or more embodiments may be applied to a center information display (CID) located on an instrument panel, a center fascia, or a dashboard of a vehicle, a room mirror display replacing a side-view mirror of a vehicle, or a display screen located on the back of a front seat for entertainment for a person in a back seat of a vehicle.

Figure 5:
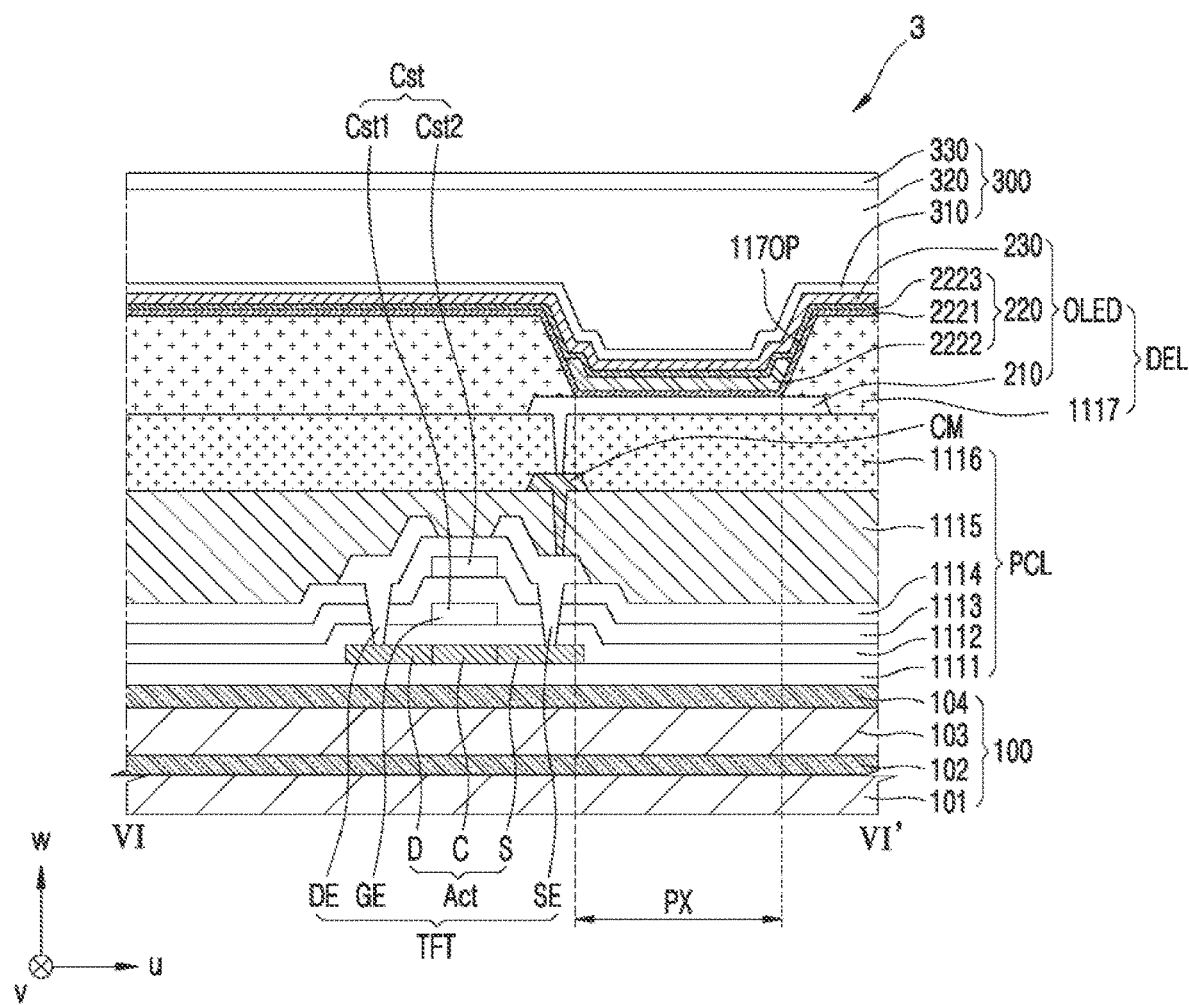
FIG. 5 is a cross-sectional view schematically illustrating a display apparatus manufactured by a method of manufacturing a display apparatus, according to one or more embodiments.

FIG. 5 is a cross-sectional view schematically illustrating a display apparatus manufactured by using a method of manufacturing a display apparatus, taken along the line V-V' of FIG. 4, according to one or more embodiments.

Referring to FIG. 5, the display apparatus 3 may have a structure in which a substrate 100, a pixel circuit layer PCL, a display element layer DEL, and an encapsulation layer 300 are stacked.

The substrate 100 may have a multi-layer structure including a base layer including a polymer resin and an inorganic layer. For example, the substrate 100 may include a base layer including a polymer resin and a barrier layer of an inorganic insulating layer. For example, the substrate 100 may include a first base layer 101, a first barrier layer 102, a second base layer 103, and a second barrier layer 104 that are sequentially stacked. Each of the first base layer 101 and the second base layer 103 may include polyimide (PI), polyethersulfone (PES), polyarylate, polyetherimide (PEI), polyethylene naphthalate (PEN), polyethylene terephthalate (PET), polyphenylene sulfide (PPS), polycarbonate, cellulose triacetate (TAC), and/or cellulose acetate propionate (CAP). Each of the first barrier layer 102 and the second barrier layer 104 may include an inorganic insulating material, such as silicon oxide, silicon oxynitride, and/or silicon nitride. The substrate 100 may be flexible.

The pixel circuit layer PCL is located on the substrate 100. In FIG. 5, the pixel circuit layer PCL includes a thin-film transistor TFT, and a buffer layer 1111, a first gate insulating layer 1112, a second gate insulating layer 1113, an interlayer insulating layer 1114, a first planarization insulating layer 1115, and a second planarization insulating layer 1116 respectively located under and/or over elements of the thin-film transistor TFT.

The buffer layer 1111 may reduce or block penetration of a foreign material, moisture, or external air from the bottom of the substrate 100, and may planarize the substrate 100. The buffer layer 1111 may include an inorganic insulating material, such as silicon oxide, silicon oxynitride, or silicon nitride, and may have a single or multi-layer structure including the above material.

The thin-film transistor TFT on the buffer layer 1111 may include a semiconductor layer Act, and the semiconductor layer Act may include polysilicon (poly-Si). Alternatively, the semiconductor layer Act may include amorphous silicon (a-Si), an oxide semiconductor, or an organic semiconductor. The semiconductor layer Act may include a channel region C, and a drain region D and a source region S located on both sides of the channel region C. A gate electrode GE may overlap the channel region C.

The gate electrode GE may include a low-resistance metal material. The gate electrode GE may include a conductive material including molybdenum (Mo), aluminum (Al), copper (Cu), or titanium (Ti), and may have a single or multi-layer structure including the above material.

The first gate insulating layer 1112 between the semiconductor layer Act and the gate electrode GE may include an inorganic insulating material, such as silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnOx). Zinc oxide (ZnOx) may be zinc oxide (ZnO) and/or zinc peroxide ($ZnO_2$).

The second gate insulating layer 1113 may cover the gate electrode GE. The second gate insulating layer 1113 may include an inorganic insulating material, such as silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnOx), like the first gate insulating layer 1112. Zinc oxide (ZnOx) may be zinc oxide (ZnO) and/or zinc peroxide ($ZnO_2$).

An upper electrode Cst2 of a storage capacitor Cst may be located on the second gate insulating layer 1113. The upper electrode Cst2 may overlap the gate electrode GE that is located below the upper electrode Cst2. In this case, the gate electrode GE and the upper electrode Cst2 overlapping each other with the second gate insulating layer 1113 therebetween may constitute the storage capacitor Cst. That is, the gate electrode GE may function as a lower electrode Cst1 of the storage capacitor Cst.

As such, the storage capacitor Cst and the thin-film transistor TFT may overlap each other. In some embodiments, the storage capacitor Cst may not overlap the thin-film transistor TFT.

The upper electrode Cst2 may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu), and may have a single or multi-layer structure including the above material.

The interlayer insulating layer 1114 may cover the upper electrode Cst2. The interlayer insulating layer 1114 may include silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnOx). Zinc oxide (ZnOx) may be zinc oxide (ZnO) and/or zinc peroxide ($ZnO_2$). The interlayer insulating layer 1114 may have a single or multi-layer structure including the above inorganic insulating material.

Each of a drain electrode DE and a source electrode SE may be located on the interlayer insulating layer 1114. The drain electrode DE and the source electrode SE may be respectively connected to the drain region D and the source region S through contact holes formed in insulating layers under the drain electrode DE and the source electrode SE. Each of the drain electrode DE and the source electrode SE may include a material having excellent conductivity. Each of the drain electrode DE and the source electrode SE may include a conductive material including molybdenum (Mo), aluminum (Al), copper (Cu), or titanium (Ti), and may have a single or multi-layer structure including the above material. In one or more embodiments, each of the drain electrode DE and the source electrode SE may have a multi-layer structure including Ti/Al/Ti.

A first planarization insulating layer 1115 may cover the drain electrode DE and the source electrode SE. The first planarization insulating layer 1115 may include an organic insulating material, such as a general-purpose polymer (e.g., polymethyl methacrylate (PMMA) or polystyrene (PS)), a polymer derivative having a phenol-based group, an acrylic polymer, an imide-based polymer, an aryl ether-based polymer, an amide-based polymer, a fluorinated polymer, a p-xylene-based polymer, a vinyl alcohol-based polymer, or a blend thereof.

The second planarization insulating layer 1116 may be located on the first planarization insulating layer 1115. The second planarization insulating layer 1116 may include the same material as that of the first planarization insulating layer 1115, and may include an organic insulating material, such as a general-purpose polymer (e.g., PMMA or PS), a polymer derivative having a phenol-based group, an acrylic polymer, an imide-based polymer, an aryl ether-based polymer, an amide-based polymer, a fluorinated polymer, a p-xylene-based polymer, a vinyl alcohol-based polymer, or a blend thereof.

The display element layer DEL may be located on the pixel circuit layer PCL having the above structure. The display element layer DEL may include an organic light-emitting diode OLED as a display element (e.g., a light-emitting element), and the organic light-emitting diode OLED may have a structure in which a pixel electrode 210, an intermediate layer 220, and a common electrode 230 are stacked. The organic light-emitting diode OLED may emit, for example, red light, green light, or blue light, or may emit red light, green light, blue light, or white light. The organic light-emitting diode OLED may emit light through an emission area, and the emission area may be defined as the pixel PX.

The pixel electrode 210 of the organic light-emitting diode OLED may be electrically connected to the thin-film transistor TFT through contact holes formed in the second planarization insulating layer 1116 and the first planarization insulating layer 1115 and a contact metal CM located on the first planarization insulating layer 1115.

The pixel electrode 210 may include a conductive oxide, such as indium tin oxide (ITO), indium zinc oxide (IZO), zinc oxide (ZnO), indium oxide ($In_2O_3$), indium gallium oxide (IGO), or aluminum zinc oxide (AZO). In one or more other embodiments, the pixel electrode 210 may include a reflective film including silver (Ag), magnesium (Mg), aluminum (Al), platinum (Pt), palladium (Pd), gold (Au), nickel (Ni), neodymium (Nd), iridium (Ir), chromium (Cr), or a compound thereof. In one or more other embodiments, the pixel electrode 210 may further include a film formed of ITO, IZO, ZnO, or $In_2O_3$ over/under the reflective film.

A bank layer 1117 having an opening 1170P through which a central portion of the pixel electrode 210 is exposed is located on the pixel electrode 210. The bank layer 1117 may include an organic insulating material and/or an inorganic insulating material. The opening 1170P may define the emission area of light emitted by the organic light-emitting diode OLED. For example, a size/width of the opening 1170P may correspond to a size/width of the emission area. Accordingly, a size and/or a width of the pixel PX may depend on a size and/or a width of the opening 1170P of the bank layer 1117.

The intermediate layer 220 may include an emission layer 2222 formed to correspond to the pixel electrode 210. The emission layer 2222 may include a high molecular weight organic material or a low molecular weight organic material that emits light of a corresponding color. Alternatively, the emission layer 2222 may include an inorganic light-emitting material or may include quantum dots.

In one or more embodiments, the intermediate layer 220 may include a first functional layer 2221 and a second functional layer 2223 respectively located under and over the emission layer 2222. The first functional layer 2221 may include, for example, a hole transport layer (HTL), or may include an HTL and a hole injection layer (HIL). The second functional layer 2223 that is an element located on the emission layer 2222 may include an electron transport layer (ETL) and/or an electron injection layer (EIL). The first functional layer 2221 and/or the second functional layer 2223 may be a common layer entirely covering the substrate 100, like the common electrode 230 described below.

The common electrode 230 may be located on the pixel electrode 210, and may overlap the pixel electrode 210. The common electrode 230 may be formed of a conductive material having a low work function. For example, the common electrode 230 may include a (semi)transparent layer including silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), or an alloy thereof. Alternatively, the common electrode 230 may further include a layer formed of ITO, IZO, ZnO, or $In_2O_3$ on the (semi)transparent layer including the above material. The common electrode 230 may be integrally formed to entirely cover the substrate 100.

The encapsulation layer 300 may be located on the display element layer DEL and may cover the display element layer DEL. The encapsulation layer 300 may include at least one inorganic encapsulation layer and at least one organic encapsulation layer. In one or more embodiments, in FIG. 5, the encapsulation layer 300 includes a first inorganic encapsulation layer 310, an organic encapsulation layer 320, and a second inorganic encapsulation layer 330, which are sequentially stacked.

Each of the first inorganic encapsulation layer 310 and the second inorganic encapsulation layer 330 may include at least one inorganic material from among aluminum oxide, titanium oxide, tantalum oxide, hafnium oxide, zinc oxide, silicon oxide, silicon nitride, and silicon oxynitride. The organic encapsulation layer 320 may include a polymer-based material. Examples of the polymer-based material may include an acrylic resin, an epoxy resin, polyimide, and polyethylene. In one or more embodiments, the organic encapsulation layer 320 may include acrylate. The organic encapsulation layer 320 may be formed by curing a monomer or applying a polymer. The organic encapsulation layer 320 may be transparent.

In one or more embodiments, a touch sensor layer may be located on the encapsulation layer 300, and an optical functional layer may be located on the touch sensor layer. The touch sensor layer may obtain coordinate information according to an external input, for example, a touch event. The optical functional layer may reduce a reflectance of light (external light) incident on the display apparatus, and/or improve color purity of light emitted from the display apparatus. In one or more embodiments, the optical functional layer may include a phase retarder and/or a polarizer. The phase retarder may be a film-type phase retarder or a liquid crystal coating-type phase retarder, and may include a λ/2 phase retarder and/or a λ/4 phase retarder. The polarizer may also be a film-type polarizer or a liquid crystal coating-type polarizer. The film-type polarizer may include a stretchable synthetic resin film, and the liquid crystal coating-type polarizer may include liquid crystals arranged in a certain arrangement. The phase retarder and the polarizer may further include a protective film.

An adhesive member may be located between the touch sensor layer and the optical functional layer. The adhesive member may be a general member well known in the art without limitation. The adhesive member may be a pressure sensitive adhesive (PSA).

At least one of the 1-$1^{st}$ component GD1-1, the 2-$1^{st}$ component GD2-1, and the 3-$1^{st}$ component GD3-1 described with reference to FIGS. 1 to 3 may include at least one of the substrate 100, the pixel circuit layer PCL, the display element layer DEL, and the encapsulation layer 300.

Figure 6:
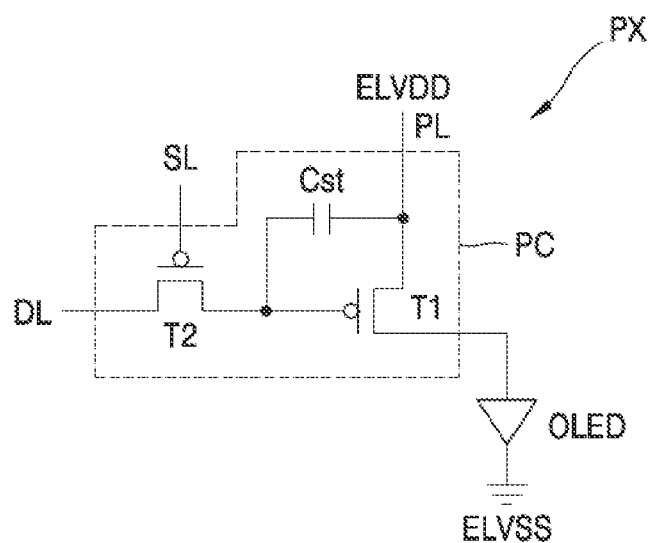
FIG. 6 is an equivalent circuit diagram illustrating a pixel included in a display panel, according to one or more embodiments.

FIG. 6 is an equivalent circuit diagram illustrating a pixel included in a display panel, according to one or more embodiments.

Each pixel PX may include a pixel circuit PC, and a display element connected to the pixel circuit PC, for example, an organic light-emitting diode OLED. The pixel circuit PC may include a first thin-film transistor T1, a second thin-film transistor T2, and a storage capacitor Cst. Each pixel PX may emit light, for example, red light, green light, blue light, or white light, through the organic light-emitting diode OLED.

The second thin-film transistor T2, which is a switching thin-film transistor, may be connected to a scan line SL and a data line DL, and may transmit a data voltage input from the data line DL to the first thin-film transistor T1 based on a switching voltage input from the scan line SL. The storage capacitor Cst may be connected to the second thin-film transistor T2 and a driving voltage line PL, and may store a voltage corresponding to a difference between a voltage received from the second thin-film transistor T2 and a first power supply voltage ELVDD supplied to the driving voltage line PL.

The first thin-film transistor T1 that is a driving thin-film transistor may be connected to the driving voltage line PL and the storage capacitor Cst, and may control driving current flowing from the driving voltage line PL to the organic light-emitting diode OLED according to a value of the voltage stored in the storage capacitor Cst. The organic light-emitting diode OLED may emit light having a certain luminance due to the driving current. A counter electrode (e.g., a cathode) of the organic light-emitting diode OLED may receive a second power supply voltage ELVSS.

Although the pixel circuit PC includes two thin-film transistors and one storage capacitor in FIG. 6, the disclosure is not limited thereto. The number of thin-film transistors and the number of storage capacitors may be changed in various ways according to a design of the pixel circuit PC. For example, the pixel circuit PC may further include four, five, or more thin-film transistors in addition to the above two thin-film transistors.

According to the embodiments, an apparatus for manufacturing a display apparatus may be efficiently operated by adjusting a filling rate of a storage to be equal to or less than an appropriate filling rate.

The effects of the disclosure are not limited to the above-mentioned effects, and other effects not mentioned herein will be clearly understood by one of ordinary skill in the art from the appended claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope as defined by the following claims, with functional equivalents thereof to be included therein.

What is claimed is:

1. An apparatus for manufacturing a display apparatus, the apparatus comprising:
a first process line comprising 1-$1^{st}$ processors configured to process a first component into a 1-$1^{st}$ component, and 1-$2^{nd}$ processors configured to process a second component into a 2-$1^{st}$ component;
a second process line spaced apart from the first process line, and comprising 2-$1^{st}$ processors configured to process the 1-$1^{st}$ component, and 2-$2^{nd}$ processors configured to process the 2-$1^{st}$ component;
a storage between the first process line and the second process line, and configured to store the 1-$1^{st}$ component and the 2-$1^{st}$ component;
transporters configured to move along a transport path between the first process line and the second process line, and configured to transport the 1-$1^{st}$ component and the 2-$1^{st}$ component among the first process line, the second process line, and the storage; and
a controller configured to control the first process line, and comprising:
a simulator configured to simulate a final model for converting at least one of the 1-$1^{st}$ processors and the 1-$2^{nd}$ processors into a down state, in a virtual space, so that a filling rate, which is a ratio of a used capacity of the storage to a total capacity of the storage, is equal to or less than a first value; and
a process controller configured to control the first process line according to the final model.

2. The apparatus of claim 1, wherein the simulator comprises:
an initial model generator configured to generate an initial model for converting at least one of the 1-$1^{st}$ processors and the 1-$2^{nd}$ processors into a down state, in the virtual space, so that the filling rate is equal to or less than the first value;

a calculator configured to calculate the filling rate in the virtual space after the first process line is controlled for a first time according to the initial model in the virtual space; and a model corrector configured to determine the filling rate in the virtual space according to the initial model is greater than the first value, and to correct the initial model into a second model.

3. The apparatus of claim 2, wherein the second model is for additionally converting one or more of the $1\text{-}1^{st}$ processors and the $1\text{-}2^{nd}$ processors having a highest progress rate, which is a ratio of a current processing number to a target processing number for a designated time, from a run state to a down state.

4. The apparatus of claim 2, wherein the calculator is further configured to calculate the filling rate in the virtual space after the first process line is controlled for the first time according to the second model in the virtual space.

5. The apparatus of claim 4, wherein the model corrector is further configured to determine the filling rate in the virtual space according to the second model is greater than the first value, and to correct the second model into a third model.

6. The apparatus of claim 4, wherein the second model is the final model, and wherein the filling rate in the virtual space according to the second model is equal to or less than the first value.

7. The apparatus of claim 2, wherein the controller further comprises a filling rate calculator configured to calculate the filling rate after the first process line is controlled according to the final model.

8. The apparatus of claim 7, wherein the process controller is further configured to determine that the filling rate satisfies a first condition, and to convert the first process line into a down state.

9. The apparatus of claim 8, wherein the first condition indicates that the filling rate is greater than a second value that is higher than the first value.

10. The apparatus of claim 8, wherein the first condition indicates that the filling rate is greater than the first value after the first time elapses, and wherein the process controller is configured to control the first process line according to the final model.

11. A method of manufacturing a display apparatus, the method comprising:
   locating a first process line comprising a $1\text{-}1^{st}$ processor and a $1\text{-}2^{nd}$ processor;
   locating a second process line comprising a $2\text{-}1^{st}$ processor and a $2\text{-}2^{nd}$ processor, and spaced apart from the first process line;
   locating a storage between the first process line and the second process line;
   processing a first component into a $1\text{-}1^{st}$ component with the $1\text{-}1^{st}$ processor;
   processing a second component into a $2\text{-}1^{st}$ component with the $1\text{-}2^{nd}$ processor;
   transporting the $1\text{-}1^{st}$ component from the $1\text{-}1^{st}$ processor to the $2\text{-}1^{st}$ processor with transporters;
   processing the $1\text{-}1^{st}$ component with the $2\text{-}1^{st}$ processor;
   transporting the $2\text{-}1^{st}$ component from the $1\text{-}2^{nd}$ processor to the $2\text{-}2^{nd}$ processor with the transporters;
   processing the $2\text{-}1^{st}$ component with the $2\text{-}2^{nd}$ processor;
   transporting the $1\text{-}1^{st}$ component and the $2\text{-}1^{st}$ component to the storage with the transporters;
   storing the $1\text{-}1^{st}$ component and the $2\text{-}1^{st}$ component in the storage; and
   controlling the first process line by performing:
      a simulation operation of simulating a final model for converting the $1\text{-}1^{st}$ processor or $1\text{-}2^{nd}$ processor into a down state, in a virtual space, so that a filling rate, which is a ratio of a used capacity of the storage to a total capacity of the storage, is equal to or less than a first value; and
      a processor control operation comprising a final model application operation of controlling the first process line according to the final model.

12. The method of claim 11, wherein the simulation operation comprises:
   an initial model generation operation of generating an initial model for converting the $1\text{-}1^{st}$ processor or the $1\text{-}2^{nd}$ processor into a down state, in the virtual space, so that the filling rate is equal to or less than the first value;
   a virtual space application operation comprising an operation of controlling the first process line according to the initial model in the virtual space;
   a virtual space calculation operation comprising an operation of calculating the filling rate in the virtual space, after a first time elapses from a time, the virtual space application operation starting according to the initial model; and
   a model correction operation comprising an operation of correcting the initial model into a second model, the filling rate in the virtual space according to the initial model calculated in the virtual space calculation operation being greater than the first value.

13. The method of claim 12, wherein the second model is for additionally converting the $1\text{-}1^{st}$ processor or the $1\text{-}2^{nd}$ processor having a highest progress rate, which is a ratio of a current processing number to a target processing number for a designated time, from a run state to a down state.

14. The method of claim 12, wherein the virtual space calculation operation further comprises an operation of calculating the filling rate in the virtual space after the first time elapses, the virtual space application operation starting according to the second model.

15. The method of claim 14, wherein the model correction operation further comprises an operation of correcting the second model into a third model, and wherein the filling rate in the virtual space according to the second model calculated in the virtual space calculation operation is greater than the first value.

16. The method of claim 15, wherein the second model is the final model, and wherein the filling rate according to the second model is equal to or less than the first value.

17. The method of claim 12, wherein the processor control operation further comprises a filling rate calculation operation of calculating the filling rate after the final model application operation.

18. The method of claim 17, wherein the processor control operation further comprises a first process line down operation of converting the first process line into a down state, wherein the filling rate calculated in the filling rate calculation operation satisfies a first condition.

19. The method of claim 18, wherein the first condition indicates the filling rate is greater than a second value that is higher than the first value.

20. The method of claim 18, wherein the first condition indicates the filling rate calculated in the filling rate calculation operation is greater than the first value after the first time elapses from the final model application operation.

* * * * *